US012737634B2

(12) United States Patent
Chang et al.

(10) Patent No.: US 12,737,634 B2
(45) Date of Patent: Sep. 15, 2026

(54) ARTIFICIAL NEURAL NETWORK MODEL TRAINING METHOD, FREQUENCY UNIFORM MULTI-BEAM GENERATION METHOD, AND COMPUTER READABLE STORAGE MEDIUM STORING INSTRUCTIONS TO PERFORM ARTIFICIAL NEURAL NETWORK MODEL TRAINING METHOD AND FREQUENCY UNIFORM MULTI-BEAM GENERATION METHOD

(71) Applicant: AGENCY FOR DEFENSE DEVELOPMENT, Daejeon (KR)

(72) Inventors: Jaewon Chang, Daejeon (KR); Cheol Sun Park, Daejeon (KR); Seon Kyo Kim, Daejeon (KR); Jong Hee Park, Daejeon (KR); Jiyun Shin, Daejeon (KR); Woojun Lee, Daejeon (KR)

(73) Assignee: Agency for Defense Development, Daejeon (KR)

( * ) Notice: Subject to any disclaimer, the term of this patent is extended or adjusted under 35 U.S.C. 154(b) by 695 days.

(21) Appl. No.: 18/327,405

(22) Filed: Jun. 1, 2023

(65) Prior Publication Data

US 2024/0273373 A1 Aug. 15, 2024

(30) Foreign Application Priority Data

Feb. 14, 2023 (KR) ........................ 10-2023-0019361

(51) Int. Cl.
*G06N 3/088* (2023.01)
*G06N 3/0985* (2023.01)

(52) U.S. Cl.
CPC ........... *G06N 3/088* (2013.01); *G06N 3/0985* (2023.01)

(58) Field of Classification Search
CPC .. G06N 20/00; H04B 7/0482; H04B 7/06952; H04B 7/0617
See application file for complete search history.

(56) References Cited

U.S. PATENT DOCUMENTS

| | | | | |
|---|---|---|---|---|
| 2016/0261330 | A1* | 9/2016 | Woodsum | H04B 7/086 |
| 2017/0061329 | A1* | 3/2017 | Kobayashi | G06N 20/00 |
| 2018/0048378 | A1 | 2/2018 | Kotecha et al. | |

FOREIGN PATENT DOCUMENTS

| | | |
|---|---|---|
| KR | 10-2021-0139283 A | 11/2021 |
| KR | 10-2022-0103124 A | 7/2022 |

OTHER PUBLICATIONS

Sallam, Tarek, et al. "A neural-network-based beamformer for phased array weather radar." IEEE Transactions on Geoscience and Remote Sensing 54.9 (2016): 5095-5104. (Year: 2016).*

(Continued)

*Primary Examiner* — Schyler S Sanks
(74) *Attorney, Agent, or Firm* — Knobbe, Martens, Olson & Bear, LLP

(57) ABSTRACT

An artificial neural network model training method is proposed. The method may include preparing training data including digital intermediate frequency data based on a signal received from an antenna array of a multiple input multiple output (MIMO) system as input data, and at least one of a target beam pattern and a target weight vector as output data. The method may also include training an artificial neural network model for wideband frequency uniform multi-beam generation using the training data. A weight vector of the artificial neural network model may be recursively trained using at least one of a target beam pattern-based loss function and a target weight vector-based loss function necessary to generate desired multiple beams.

15 Claims, 10 Drawing Sheets

(56) References Cited

OTHER PUBLICATIONS

Office Action issued in Korean Patent Application No. 10-2023-0019361 dated Nov. 10, 2025, in 18 pages.

* cited by examiner

ARTIFICIAL NEURAL NETWORK MODEL TRAINING METHOD, FREQUENCY UNIFORM MULTI-BEAM GENERATION METHOD, AND COMPUTER READABLE STORAGE MEDIUM STORING INSTRUCTIONS TO PERFORM ARTIFICIAL NEURAL NETWORK MODEL TRAINING METHOD AND FREQUENCY UNIFORM MULTI-BEAM GENERATION METHOD

CROSS-REFERENCE TO RELATED APPLICATION

This application claims priority to Korean Patent Application No. 10-2023-0019361 filed on Feb. 14, 2023, the entire contents of which is incorporated herein by reference.

BACKGROUND

Technical Field

The present disclosure relates to an electronic device including an artificial neural network model, a method of training an artificial neural network model of the electronic device, and a method of generating a frequency uniform multi-beam by the electronic device including the trained artificial neural network model.

Description of Related Technology

A multiple input multiple output (MIMO) system can improve system performance and maximize communication capacity while using the same frequency resources and power in a wireless communication environment.

In addition, reception beamforming, which is a type of beamforming, is performed in order to improve signal reception performance by matching the phase of a receiving end to a received signal when the signal is received by a MIMO. Such reception beamforming is modeled by multiplying a received signal by a reception beamforming weight vector.

SUMMARY

One aspect is to provide a data approach using an artificial neural network structure as a method for uniformly generating a synthesized reception beam width over a desired frequency band.

According to an embodiment, an artificial neural network model training method for training an artificial neural network model such that the artificial neural network model can generate wideband frequency uniform multiple beams using training data generated by simulating digital intermediate frequency data and an electronic device therefor are provided.

In addition, a method of generating wideband frequency uniform multiple beams by inputting digital intermediate frequency data generated through digital signal processing after being received by an antenna array for each frequency and azimuth to an artificial neural network model trained in advance and an electronic device therefor are provided.

In accordance with a first aspect of the present disclosure, there is provided an artificial neural network model training method, the method may comprise: preparing training data including digital intermediate frequency data based on a signal received from an antenna array of a multiple input multiple output (MIMO) system as input data, and at least one of a target beam pattern and a target weight vector as output data; and training an artificial neural network model for wideband frequency uniform multi-beam generation using the training data, wherein a weight vector of the artificial neural network model may be recursively trained using at least one of a target beam pattern-based loss function and a target weight vector-based loss function necessary to generate desired multiple beams.

In accordance with a second aspect of the present disclosure, there is provided an artificial neural network model training apparatus, the apparatus may comprise: a memory storing an artificial neural network model for wideband frequency uniform multi-beam generation, and a processor executing one or more instructions stored in the memory, wherein the instructions, when executed by the processor, cause the processor to prepare training data including digital intermediate frequency data based on a signal received from an antenna array of a multiple input multiple output (MIMO) system as input data, and at least one of a target beam pattern and a target weight vector as output data; and train the artificial neural network model for wideband frequency uniform multi-beam generation using the training data, wherein a weight vector of the artificial neural network model may be recursively trained using at least one of a target beam pattern-based loss function and a target weight vector-based loss function necessary to generate desired multiple beams.

In accordance with a third aspect of the present disclosure, there is provided a wideband frequency uniform multi-beam generation method, the method may comprise: preparing digital intermediate frequency data based on a signal received from an antenna array of a multiple input multiple output (MIMO) system; and inputting the digital intermediate frequency data to a pre-trained artificial neural network model to generate wideband frequency uniform multiple beams as an output of the artificial neural network model, wherein a weight vector of the artificial neural network model may be recursively trained using at least one of a target beam pattern-based loss function and a target weight vector-based loss function necessary to generate desired multiple beams.

In accordance with a fourth aspect of the present disclosure, there is provided a wideband frequency uniform multi-beam generation apparatus, the apparatus may comprise: a memory storing a pre-trained artificial neural network model for wideband frequency uniform multi-beam generation, and a processor executing one or more instructions stored in the memory, wherein the instructions, when executed by the processor, cause the processor to prepare digital intermediate frequency data based on a signal received from an antenna array of a multiple input multiple output (MIMO) system; and input the digital intermediate frequency data to the pre-trained artificial neural network model to generate wideband frequency uniform multiple beams as an output of the artificial neural network model, wherein a weight vector of the artificial neural network model may be recursively trained using at least one of a target beam pattern-based loss function and a target weight vector-based loss function necessary to generate desired multiple beams.

In accordance with a fifth aspect of the present disclosure, there is provided a non-transitory computer-readable storage medium, the non-transitory computer readable storage medium may comprise computer executable instructions, wherein the instructions, when executed by a processor, cause the processor to perform an artificial neural network model training method.

In accordance with a sixth aspect of the present disclosure, there is provided a computer program stored in a non-transitory computer-readable storage medium, the computer program may comprise computer executable instructions, wherein the instructions, when executed by a processor, cause the processor to perform an artificial neural network model training method.

In accordance with a seventh aspect of the present disclosure, there is provided a non-transitory computer-readable storage medium, the non-transitory computer readable storage medium may comprise computer executable instructions, wherein the instructions, when executed by a processor, cause the processor to perform a wideband frequency uniform multi-beam generation method.

In accordance with an eighth aspect of the present disclosure, there is provided a computer program stored in a non-transitory computer-readable storage medium, the computer program may comprise computer executable instructions, wherein the instructions, when executed by a processor, cause the processor to perform a wideband frequency uniform multi-beam generation method.

According to an embodiment, an artificial neural network model formed to generate wideband frequency uniform multiple beams can be trained by simulating digital intermediate frequency data that can be generated through digital signal processing after being received by an antenna array for each frequency and azimuth. In addition, wideband frequency uniform multiple beams for which a uniform beam width is guaranteed can be synthesized as an output of the trained artificial neural network model regardless of frequency change by inputting the digital intermediate frequency data generated through digital signal processing after being received by the antenna array for each frequency and azimuth to the trained artificial neural network model.

DETAILED DESCRIPTION

Figure 1:
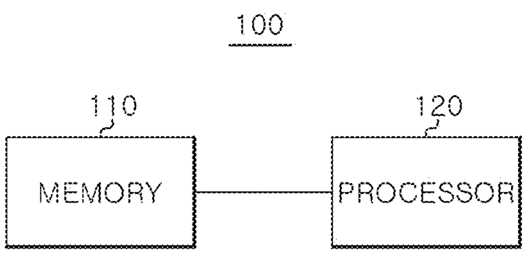
FIG. 1 is a configuration diagram of an electronic device capable of performing an artificial neural network model training method and/or a frequency uniform multi-beam generation method according to an embodiment of the present disclosure.

A processing device for reception beamforming requires an antenna array composed of a plurality of antennas, a multi-channel receiver, and a digital signal processor. A beam width is determined by a ratio of the wavelength of a received signal to a fixed antenna spacing in the array antenna used for beamforming, and a formed beam width decreases as the frequency changes from a low frequency band to a high frequency band, in general. This characteristic means that the azimuth range in which signals can be simultaneously received decreases as the frequency increases. Therefore, in order to effectively receive signals in a certain azimuth range in all required frequency bands, a signal processing technique for frequency uniform beam synthesis guaranteeing a uniform beam width regardless of frequency change is required.

A beamforming weight vector generation method for reception beam synthesis adopts a linear technique using maximum ratio combining (MRC) or minimum mean squared error (MMSE). Such a reception beam synthesis method has limitations in generating a uniform beam over a wide frequency band because the beam width is determined by a ratio of the wavelength of a received signal to a fixed antenna spacing.

The advantages and features of the embodiments and the methods of accomplishing the embodiments will be clearly understood from the following description taken in conjunction with the accompanying drawings. However, embodiments are not limited to those embodiments described, as embodiments may be implemented in various forms. It should be noted that the present embodiments are provided to make a full disclosure and also to allow those skilled in the art to know the full range of the embodiments. Therefore, the embodiments are to be defined only by the scope of the appended claims.

Terms used in the present specification will be briefly described, and the present disclosure will be described in detail.

In terms used in the present disclosure, general terms currently as widely used as possible while considering functions in the present disclosure are used. However, the terms may vary according to the intention or precedent of a technician working in the field, the emergence of new technologies, and the like. In addition, in certain cases, there are terms arbitrarily selected by the applicant, and in this case, the meaning of the terms will be described in detail in the description of the corresponding invention. Therefore, the terms used in the present disclosure should be defined based on the meaning of the terms and the overall contents of the present disclosure, not just the name of the terms.

When it is described that a part in the overall specification "includes" a certain component, this means that other components may be further included instead of excluding other components unless specifically stated to the contrary.

In addition, a term such as a "unit" or a "portion" used in the specification means a software component or a hardware component such as FPGA or ASIC, and the "unit" or the "portion" performs a certain role. However, the "unit" or the "portion" is not limited to software or hardware. The "portion" or the "unit" may be configured to be in an addressable storage medium, or may be configured to reproduce one or more processors. Thus, as an example, the "unit" or the "portion" includes components (such as software components, object-oriented software components, class components, and task components), processes, functions, properties, procedures, subroutines, segments of program code, drivers, firmware, microcode, circuits, data, database, data structures, tables, arrays, and variables. The functions provided in the components and "unit" may be combined into a smaller number of components and "units" or may be further divided into additional components and "units".

Hereinafter, the embodiment of the present disclosure will be described in detail with reference to the accompanying drawings so that those of ordinary skill in the art may easily implement the present disclosure. In the drawings, portions not related to the description are omitted in order to clearly describe the present disclosure.

FIG. 1 is a configuration diagram of an electronic device capable of performing an artificial neural network model training method and/or a frequency uniform multi-beam generation method according to an embodiment of the present disclosure.

Referring to FIG. 1, the electronic device 100 may include a memory 110 and a processor 120. The electronic device 100 may be implemented as various devices such as a desktop PC, a notebook PC, a tablet PC, a smartphone, and a server device.

Information regarding various functions or instructions of the electronic device 100 may be stored in the memory 110. The memory 110 may include a hard disk, an SSD, a flash memory, and the like in addition to a ROM and a RAM.

One or more artificial intelligence models may be stored in the memory 110. An artificial intelligence model may be composed of a plurality of neural network layers. Each of the plurality of neural network layers has a plurality of weight values, and a neural network operation is performed using operation results of a previous layer and calculation of a plurality of weight values. A plurality of weights of a plurality of neural network layers may be optimized by training result of an artificial intelligence model. The memory 110 may include an artificial neural network model for generating wideband frequency uniform multiple beams. This artificial neural network model will be described with reference to FIGS. 3 to 5. The function of the artificial neural network model stored in the memory 110 may be performed through the processor 120 and the memory 110.

The processor 120 may be composed of one or a plurality of processors. For example, one or more processors may include a general-purpose processor such as a central processing unit (CPU) or a digital signal processor (DSP), a graphics-dedicated processor such as a graphic processing unit (GPU) or a vision process unit (VPU), and an artificial intelligence dedicated processor such as a neural processor (NPU).

Meanwhile, the electronic device 100 may further include a display for providing results of processing of the processor 120. Alternatively, the electronic device 100 may further include a communication module capable of transmitting processing result data obtained by the processor 120 to an external device.

In addition, the electronic device 100 may receive analog signals while performing an artificial neural network model training method and/or a frequency uniform multi-beam generation method, and may further include an ADC for converting received analog signals into digital signals.

Figure 2:
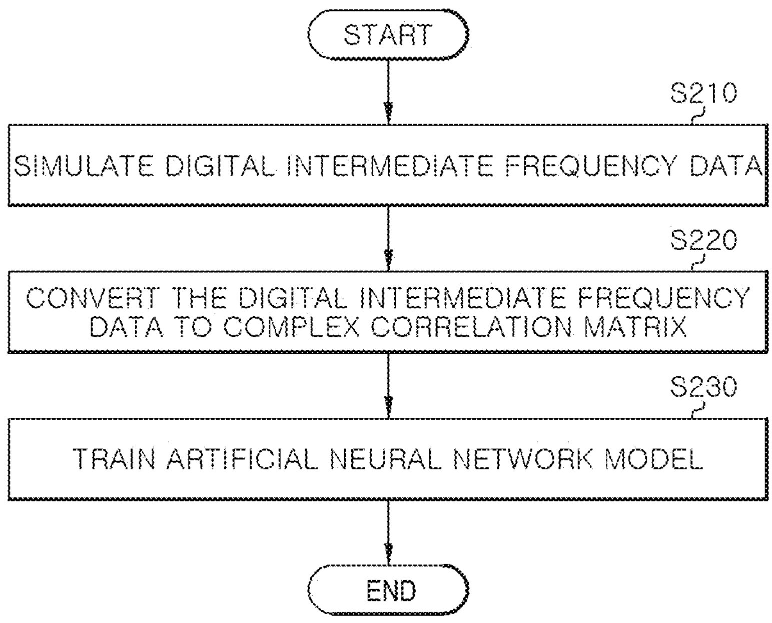
FIG. 2 is a flowchart illustrating the artificial neural network model training method according to an embodiment of the present disclosure.

FIG. 2 is a flowchart illustrating an artificial neural network model training method according to an embodiment of the present disclosure.

Referring to FIG. 2, the artificial neural network model training method according to the embodiment includes step S210 of generating training data by simulating digital intermediate frequency data that can be generated through digital signal processing after being received by an antenna array including a plurality of antennas for each frequency and azimuth.

In addition, the artificial neural network model training method according to the embodiment further includes step S220 of calculating digital intermediate frequency data, which is simulated training data, as a complex correlation matrix.

The artificial neural network model training method according to the embodiment further includes step S230 of inputting the training data to an artificial neural network model to train the artificial neural network model for generating wideband frequency uniform multiple beams.

Figure 6:
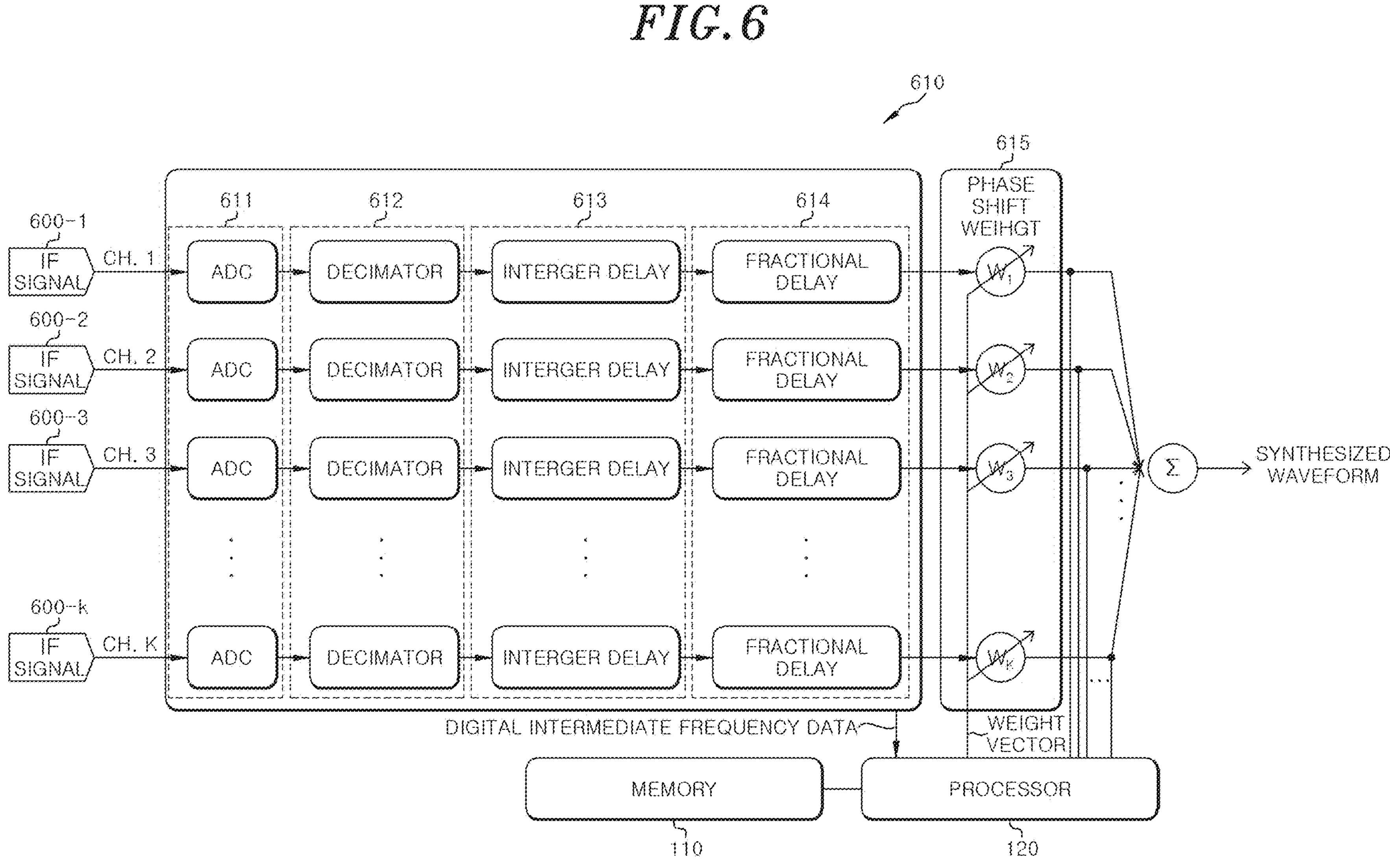
FIG. 6 is a conceptual diagram for describing the frequency uniform multi-beam generation method according to an embodiment of the present disclosure.

In order to aid in understanding the artificial neural network model training method according to the embodiment of the present disclosure, a conceptual diagram for describing a frequency uniform multi-beam generation method according to an embodiment of the present disclosure illustrated in FIG. 6 will be referred to. FIG. 6 shows an example of applying a weight vector of the artificial neural network model trained through FIG. 2 to a known digital signal processing module for generating multiple beams. Frequency uniform multi-beam generation will be described with reference to FIG. 6.

A high-frequency RF signal received by an antenna array is converted into an intermediate frequency (hereinafter referred to as "IF") signal for each channel and input to a digital signal processing module 610.

The digital signal processing module 610 may include an analog-to-digital converter (ADC) 611 and a decimator 612. The ADC 611 may sample IF signals 600-1, 600-2, 600-3, . . . , 600-*k* into digital intermediate frequency data for digital signal processing and output the digital intermediate frequency data. The decimator 612 may convert the sampled data into a frequency suitable for signal processing. In addition, the digital signal processing module 610 may further include a filter that filters the signal whose frequency has been converted through the decimator 612 to attenuate high-frequency noise of the frequency-converted signal.

In addition, the digital signal processing module 610 includes an integer delay block 613 for controlling a coarse time delay, a fractional delay (FD) block 614 for controlling a fine time delay, and a phase shift weight block 615 for correcting a beam synthesis weight vector that changes for each azimuth.

The digital signal processing module 610 may be coupled to the memory 110 and the processor 120. Here, a phase weight ROM table and a channel gain weight ROM table may be stored in the memory 110. The FD block 614 may process time delay matching with reference to correction data stored in the phase weight ROM table, and the phase shift weight block 615 may process channel gain matching with reference to correction data stored in the channel gain weight ROM table.

According to an embodiment of the present disclosure, the artificial neural network model training method may learn a weight vector of the artificial neural network model applicable to the phase shift weight block 615 through the artificial neural network model training method illustrated in FIG. 2. In this way, when a pre-trained weight vector is applied, it is possible to synthesize wideband frequency uniform multiple beams for which a uniform beam width is guaranteed regardless of a frequency change.

Figure 3:
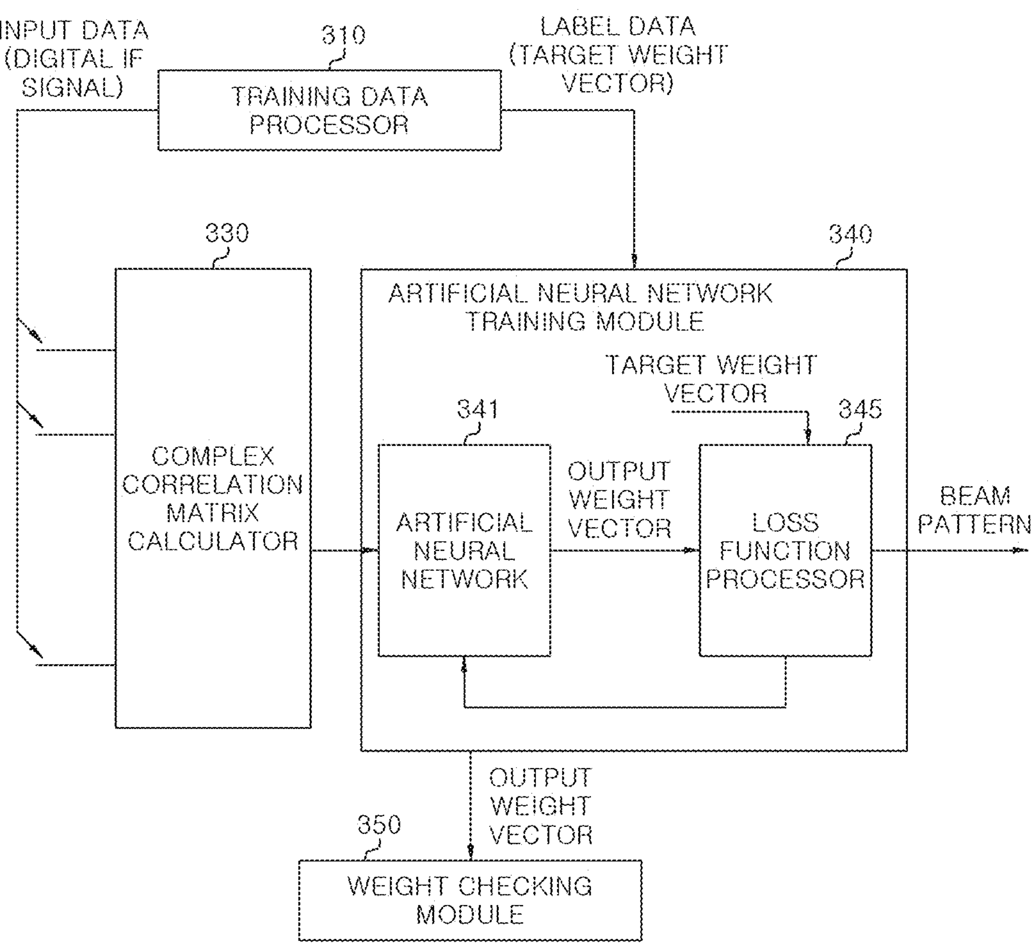
FIGS. 3 to 5 are diagrams illustrating various examples of learning a weight vector according to an embodiment of the present disclosure.
Figure 4:
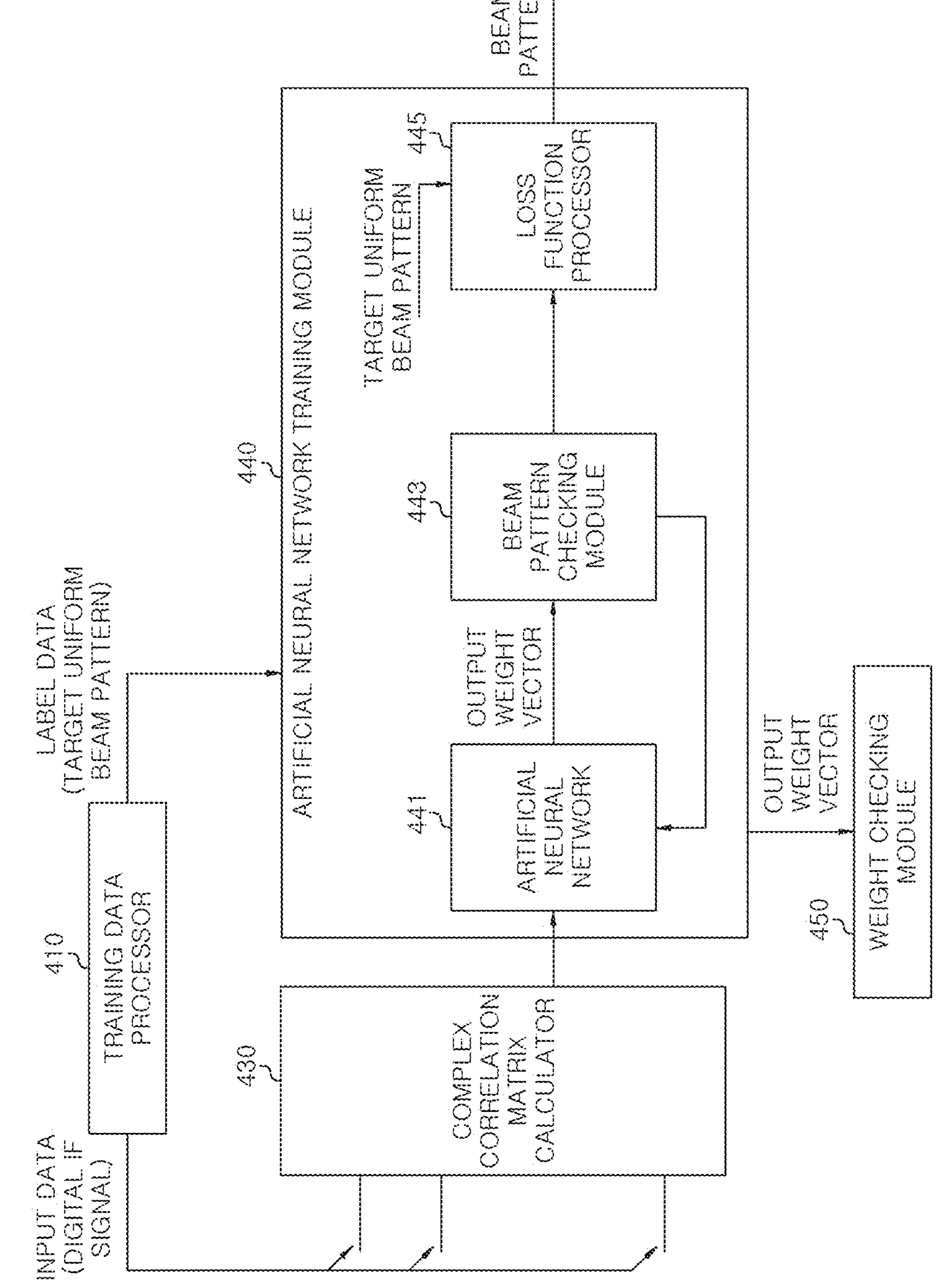
Figure 5:
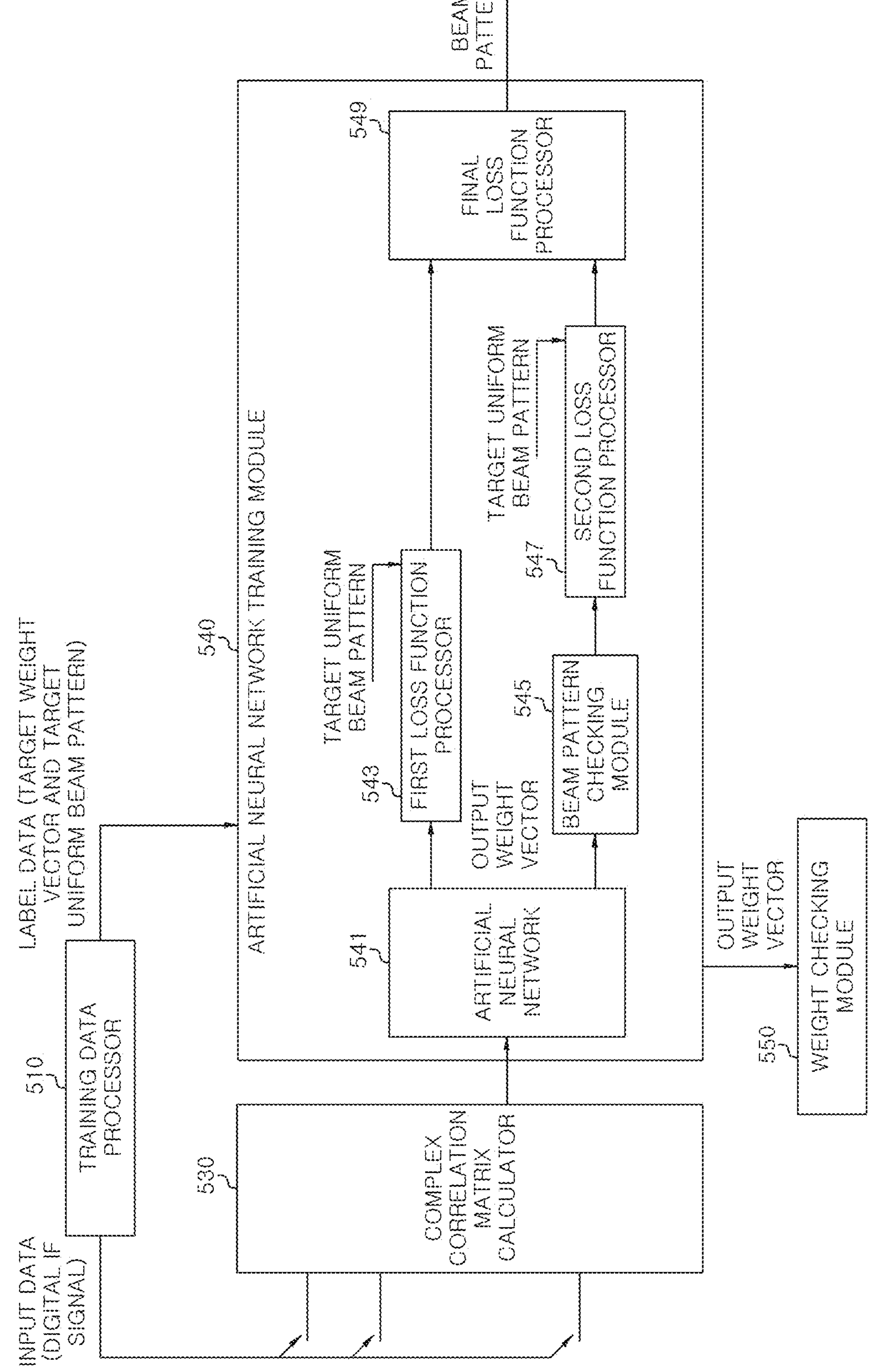

FIGS. 3 to 5 are diagrams illustrating various examples of learning a weight vector according to an embodiment of the present disclosure.

FIG. 3 is an exemplary view of an artificial neural network training device for generating wideband frequency uniform multiple beams according to an embodiment of the present disclosure.

An artificial neural network learning device for performing the artificial neural network learning method according to an embodiment of the present disclosure may be provided, and the artificial neural network training device may be configured as the electronic device 100 described above with reference to FIG. 1.

The artificial neural network training 300 may include a training data processor 310, an ADC 320, a complex correlation matrix calculator 330, an artificial neural network training module 340, and a weight checking module 350.

An artificial neural network exemplified in an embodiment of the present disclosure may be trained using a loss function based on a weight vector. For example, a shallow neural network based on a shallow hidden layer and a deep neural network based on a deep hidden layer may be applied to an artificial neural network structure.

The training data processor 310 may construct training signals and utilize these training signals as artificial neural network training data instead of directly using the digital signal processing module 610 of FIG. 6 for the above-described artificial neural network training. Here, input data for training used as artificial neural network training data may be data that has been received for each channel through the above-described antenna array, IF-converted, and digitized. The input data for training may be data based on signals collected through a MIMO system or virtual data. In addition, the artificial neural network training data may include a target weight vector used as label data. Here, the target weight vector may be a weight vector set to configure a uniform beam pattern.

Based on the foregoing, the training data processing unit 310 may manage input data for training and label data. For example, when training of the artificial neural network starts, the training data processor 310 may input training input data to the complex correlation matrix calculator 330 and provide label data to an output terminal of the artificial neural network training module unit 340.

The complex correlation matrix calculator 330 may convert the input training data into a complex correlation matrix and output the converted complex correlation matrix. The artificial neural network training module 340 inputs signals output from the complex correlation matrix calculator 330 and label data (target weight vector) corresponding thereto to a neural network 341 of a deep learning (DL) model of the artificial neural network training module 340.

The artificial neural network training module 340 may include the neural network 341 of the DL model and a loss function processor 345 and may cause the neural network 341 of the DL model to recursively learn a loss function such that weights of the neural network 341 of the DL model reach a target weight vector. Accordingly, the output weight vector of the neural network 341 of the DL model is continuously updated through learning, and thus an error with respect to the target weight vector can be minimized. The target weight vector may be determined through various techniques including weight vectors based on existing linear and non-linear techniques suitable for beam synthesis.

For example, the training data processor 310 may determine a weight vector determined through a linearly constrained minimum variance (LCMV) algorithm as a target weight vector and configure the determined target weight vector as label data.

For example, consider D (including signals and interference) signal sources received at azimuths $\theta_1, \theta_2, \ldots, \theta_D$ by an antenna array composed of M sensors having an arbitrary shape. An output of an array beam synthesizer can be expressed as follows.

$$y(k) = W^H X(k) \qquad \text{[Equation 1]}$$

The problem of finding an optimal weight $W_{opt}$ can be summarized as a constrained least mean squares (LMS) problem as follows.

$$\text{minimize } J(w) = \frac{1}{2} W^H R_{xx} W \qquad \text{[Equation 2]}$$

$$\text{subject } C^H W = f$$

Here, C is a constraint matrix and f is a constraint vector. For example, if it is necessary to generate unit gains at L azimuths and form nulls for other azimuths, the constraint matrix and constraint vector can be expressed as follows.

$$C = [a(\theta_1), \ldots, a(\theta_L), \ldots, a(\theta_D)] \qquad \text{[Equation 3]}$$

$$f = \Big[\underbrace{1, \ldots, 1}_{L}\underbrace{0, \ldots, 0}_{D-L}\Big]^2$$

Based on Equations (2) and (3), the following optimal weight vector $W_{opt}$ of the LCMV beam synthesizer can be obtained using a Lagrangian multiplier.

$$W_{opt} = R_{xx}^{-1} C \left(C^H R_{xx}^{-1} C\right)^{-1} f \qquad \text{[Equation 4]}$$

Furthermore, the output weight vector may be optimized through the above-described operation, and the artificial neural network training module 340 may construct the neural network 341 of the DL model in which the optimized weight vector is reflected.

When a signal is input to the neural network 341 of the DL model constructed as described above, the neural network 341 of the DL model may generate and output wideband frequency uniform multiple beams corresponding to the signal. In addition, the weight checking module 350 may check and output the output weight vector used to output multiple beams in the neural network 341 of the DL model.

Figure 7:
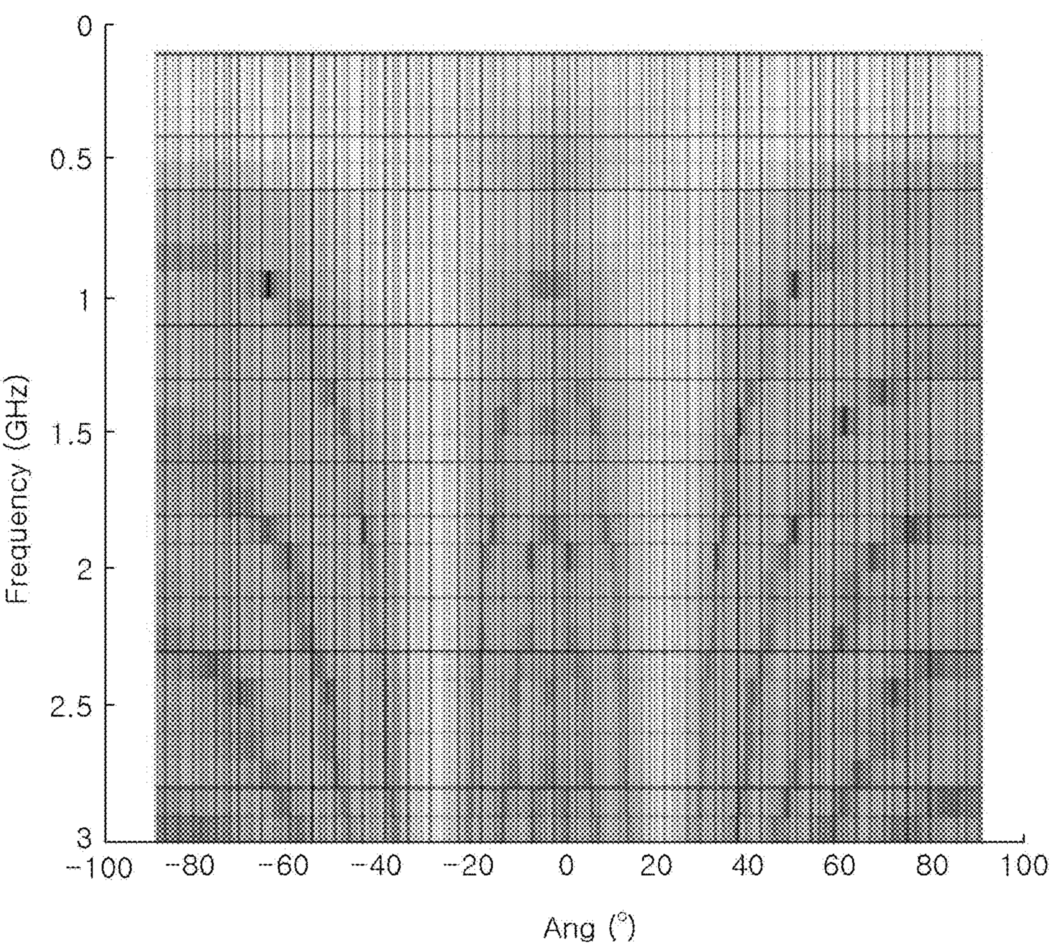
FIGS. 7 to 10 are diagrams for comparison of uniform beam patterns according to an embodiment of the present disclosure.

FIGS. 7 to 10 are results shown for comparison of uniform beam patterns according to an embodiment of the present disclosure. FIG. 7 illustrates results obtained by applying an optimal weight vector of an LCMV beam synthesizer to the phase shift weight block 615 of the digital signal processing module 610 shown in FIG. 6 and shows the intensities of beams with respect to frequency and azimuth. Multiple beams generated by an existing linear technique show a characteristic in that the width of a synthesized beam decreases as the frequency increases.

In an embodiment of the present disclosure, an artificial neural network trained with a loss function based on a weight vector has been constructed using the optimal weight vector of the LCMV beam synthesizer as a target weight vector for generating wideband frequency uniform multiple beams of FIG. 3. For example, a loss function used for training an artificial neural network may be expressed as follows.

$$L_{TWV}(\theta) = \frac{1}{N} \sum |f_{NN}(r; \theta) - W_{opt}|^2 \qquad \text{[Equation 5]}$$

In Equation 5, $f_{NN}(\cdot; \theta)$ represents an artificial neural network function parameterized by θ, and $W_{opt}$, used as a target, follows Equation 4. In this case, r is an artificial neural network input vector, and N is the number of pieces of data.

Figure 8:
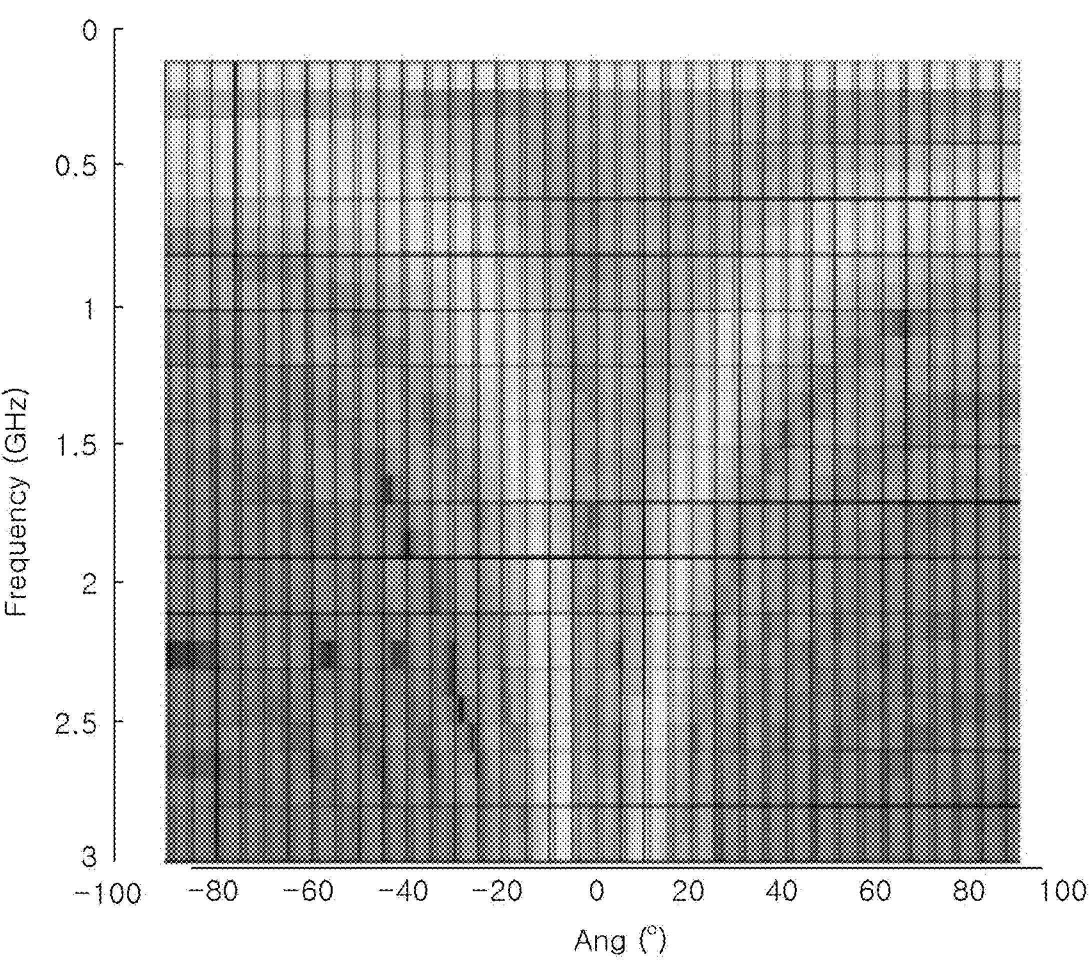

FIG. 8 illustrates results obtained by applying a weight vector obtained through the neural network 341 of the DL model trained with a target weight vector using the optimal weight vector of the LCMV beam synthesizer to the phase shift weight block 615 of FIG. 6 and shows the intensities of beams with respect to frequency and azimuth. Unlike FIG. 7, in FIG. 8, beams are uniformly distributed in a frequency band of 1.5 GHz or more, and in a low frequency band less than 1.5 GHz, the beam width gradually increases as the frequency decreases. That is, it can be ascertained that characteristics similar to those of the conventional linear technique appear in a low frequency band less than 1.5 GHz.

FIG. 4 illustrates an artificial neural network structure for generating wideband frequency uniform multiple beams according to an embodiment of the present disclosure.

An artificial neural network training device 400 may include a training data processor 410, a complex correlation matrix calculator 430, an artificial neural network training module 440, and a weight checking module 450.

The training data processor 410 may configure training signals and utilize the training signals as artificial neural network training data instead of directly using the digital signal processing module 610 illustrated in FIG. 6 for artificial neural network training. Here, input data for training used as artificial neural network training data may be data that has been received for each channel through the above-described antenna array, IF-converted, and digitized. The input data for training may be data based on signals collected through a MIMO system or virtual data. In addition, the artificial neural network training data may include a target beam pattern used as label data.

In the artificial neural network structure of FIG. 4, when training of the artificial neural network starts as in the embodiment of FIG. 3, the training data processor 420 may input training input data to the complex correlation matrix calculator 430 and provide label data to an output terminal of the artificial neural network training module 440.

The complex correlation matrix calculator 430 converts input multi-channel signals into a complex correlation matrix and outputs the complex correlation matrix, and the artificial neural network training module unit 440 inputs the signals output from the complex correlation matrix calculator 430 and label data (uniform beam patterns) corresponding thereto to a neural network 441 of the DL model of the artificial neural network training module 440. Here, a shallow neural network based on a shallow hidden layer and a deep neural network based on a deep hidden layer may be applied to the neural network 441 of the DL model.

The artificial neural network training module 440 may include the neural network 441 of the DL model, a beam pattern checking module 443, and a loss function processor 445 and may cause the neural network 441 of the DL model to recursively learn a loss function to reach a target beam pattern necessary to generate desired multiple beams of the neural network 441 of the DL model. For example, the beam pattern checking module 443 may check the output beam pattern output from the neural network 441 of the DL model and provide the output beam pattern to the loss function processor 445, and the loss function processor 445 may check a loss function $L_{TBR}$ between the output beam pattern and a uniform beam pattern which is target data. In addition, the artificial neural network training module 440 may train the neural network 441 of the DL model by continuously updating the output weight vector such that a beam with a minimized error between the output beam pattern and the target beam pattern can be formed using the loss function $L_{TBR}$.

When signals are input to the neural network 441 of the DL model constructed as described above, the neural network 441 of the DL model may generate and output wideband frequency uniform multiple beams corresponding to the signals. In addition, the weight checking module 450 may check and output the output weight vector used to output the multiple beams in the neural network 441 of the DL model.

Furthermore, the training data processor 420 may select and mathematically obtain a desired beam width shape, copy the beam width shape over the entire band, and then configure a target beam pattern used as label data.

For example, the artificial neural network training module 440 may configure an artificial neural network using a loss function using an LCMV weight vector of a specific frequency band which can satisfy the beam width of uniform multiple beams within the neural network 441 of the DL model. A beam pattern loss function $L_{TBP(\Theta)}$ used for training neural network 441 of the DL model can be expressed by Equation 6 below.

$$L_{TBR}(\theta) = \frac{1}{N}\sum |f_{NN}(r;\theta) - B_{target}|^2 \quad \text{[Equation 6]}$$

Figure 9:
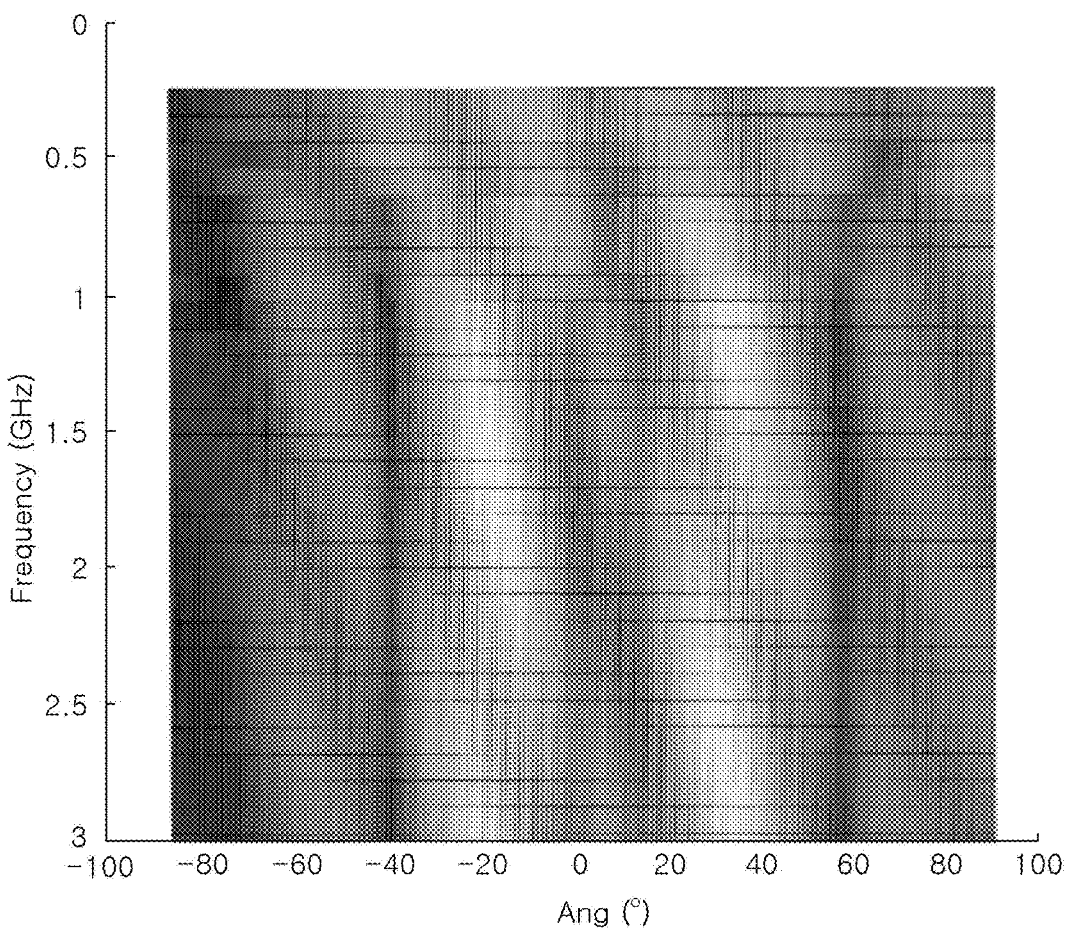

In Equation 6, $f_{NN}(\bullet;\theta)$ denotes an artificial neural network function parameterized by θ, and $B_{target}$ used as a target represents a target beam obtained by forming a beam using an LCMV weight vector of a specific frequency band which can form a desired beam width and then copying the beam over the entire band. Here, as in Equation 5 above, r is an artificial neural network input, and N is the number of pieces of data. FIG. 9 illustrates results obtained by applying a weight vector obtained through the neural network 441 of the DL model trained with a target beam pattern of 1.1 GHz frequency using the optimal weight vector of the LCMV beam synthesizer to the phase shift weight block 615 of FIG. 6, and shows the intensities of beams with respect to frequency and azimuth. Unlike FIGS. 7 and 8, in FIG. 9, beam intensities are uniformly distributed in most frequency bands. However, when a network structure is trained based on such a uniform beam pattern, the training speed is relatively low because the network learns weight vector values in accordance with the beam pattern, and received bit error rate performance through demodulation may not be guaranteed although a uniform beam waveform is improved.

In order to overcome such limitation, a hybrid training method using a target beam pattern for generating wideband frequency uniform multiple beams and simultaneously using a target weight vector for ensuring received bit error rate performance can be applied in the embodiment.

FIG. 5 illustrates an artificial neural network structure for generating wideband frequency uniform multiple beams according to an embodiment of the present disclosure.

An artificial neural network training device 500 may include a training data processor 510, a complex correlation matrix calculator 530, an artificial neural network training module 540, and a weight checking module 550.

Instead of directly using the above-described digital signal processing module 610 of FIG. 6 for artificial neural network training, training signals may be configured and used as artificial neural network training data.

Here, input data for training used as artificial neural network training data may be data that has been received for each channel through the above-described antenna array, IF-converted, and digitized. The input data for training may be data based on signals collected through a MIMO system or virtual data.

The artificial neural network training device 500 illustrated in FIG. 5 may perform a hybrid training method using a target beam pattern and simultaneously using a target weight vector for ensuring received bit error rate performance. To this end, artificial neural network training data is configured to include a target weight vector and a uniform beam pattern as label data. Here, the target weight vector may be a weight vector set to configure a uniform beam pattern.

Based on the foregoing, the training data processor 510 may manage input data for training and label data. For example, when training of the artificial neural network starts, the training data processor 510 may input training input data to the complex correlation matrix calculator 530 and provide label data to an output terminal of the artificial neural network training module 540.

The complex correlation matrix calculator 530 may convert input multi-channel signals into a complex correlation matrix and output the complex correlation matrix. The artificial neural network training module 540 may input the signal output from the complex correlation matrix calculator 530 and label data (target weight vector and uniform beam pattern) corresponding thereto to a neural network 541 of a DL model of the artificial neural network training module 540.

The artificial neural network training module 540 may cause the neural network 541 of the DL model to recursively learn a loss function such that weights of the neural network 541 of the DL model reach the target weight vector.

For example, the artificial neural network training module 540 includes the neural network 541 of the DL model, a first loss function processor 543, a beam pattern checking module 545, a second loss function processor 547, and a final loss function processor 549.

First, the neural network 541 of the DL model may be coupled to the first loss function processor 543, and the first loss function processor 543 may check an output weight of the neural network 541 of the DL model and check a first loss function $L_{TWV}$ between the output weight and the target weight vector.

In addition, the neural network 541 of the DL model may be coupled to the beam pattern checking module 545. The beam pattern checking module 545 may check an output beam pattern output through the neural network 541 of the DL model and provide the output beam pattern to the second loss function processor 547, and the second loss function processor 547 may check a second loss function $L_{TBR}$ between the output beam pattern and a uniform beam pattern, which is target data.

The final loss function processor 549 may construct a final loss function using the first loss function $L_{TWV}$ and the second loss function $L_{TBR}$ and train the neural network 541 of the DL model such that the output weight reaches the target weight vector using the final loss function.

The final loss function can be expressed by Equation 7 below.

$$L_{Total} = L_{TWV} + \alpha \cdot L_{TBP} \quad \text{[Equation 7]}$$

Here, $L_{Total}$ is the final loss function, $L_{TWV}$ is the first loss function as a loss for the target weight vector, and $L_{TBP}$ is the second loss function as a loss for the target beam pattern. α is a weight of a loss relative to the target beam pattern for the target weight vector and may be set to a value between 0 and 1. As the weight value α becomes closer to 0, the uniform beam pattern generation performance decreases but a received bit error rate decreases. As the value α becomes closer to 1, the uniform beam pattern generation performance increases and the received bit error rate also increases. Therefore, trade-off between the uniform beam pattern performance and the received bit error rate can be controlled by adjusting the weight value α. Based on the foregoing, the final loss function processor 549 may control the weight value α.

When signals are input to the neural network 541 of the DL model constructed as described above, the neural network 541 of the DL model may generate and output wideband frequency uniform multiple beams corresponding to the signals. In addition, the weight checking module 550 may check and output the output weight vector used to output the multiple beams in the neural network 541 of the DL model.

According to the embodiment of FIG. 5, it is possible to effectively receive a signal in a certain azimuth range by satisfying a received bit error rate and securing a uniform beam width regardless of frequency change and to secure a degree of spatial selection freedom for a signal. When the hybrid training method using the above-described target beam pattern and simultaneously using a target weight vector for ensuring received bit error rate performance is applied through Equation 7 in which α=0.1 is applied, wideband frequency uniform multiple beams can be generated and required received bit error rate performance can be ensured.

Figure 10:
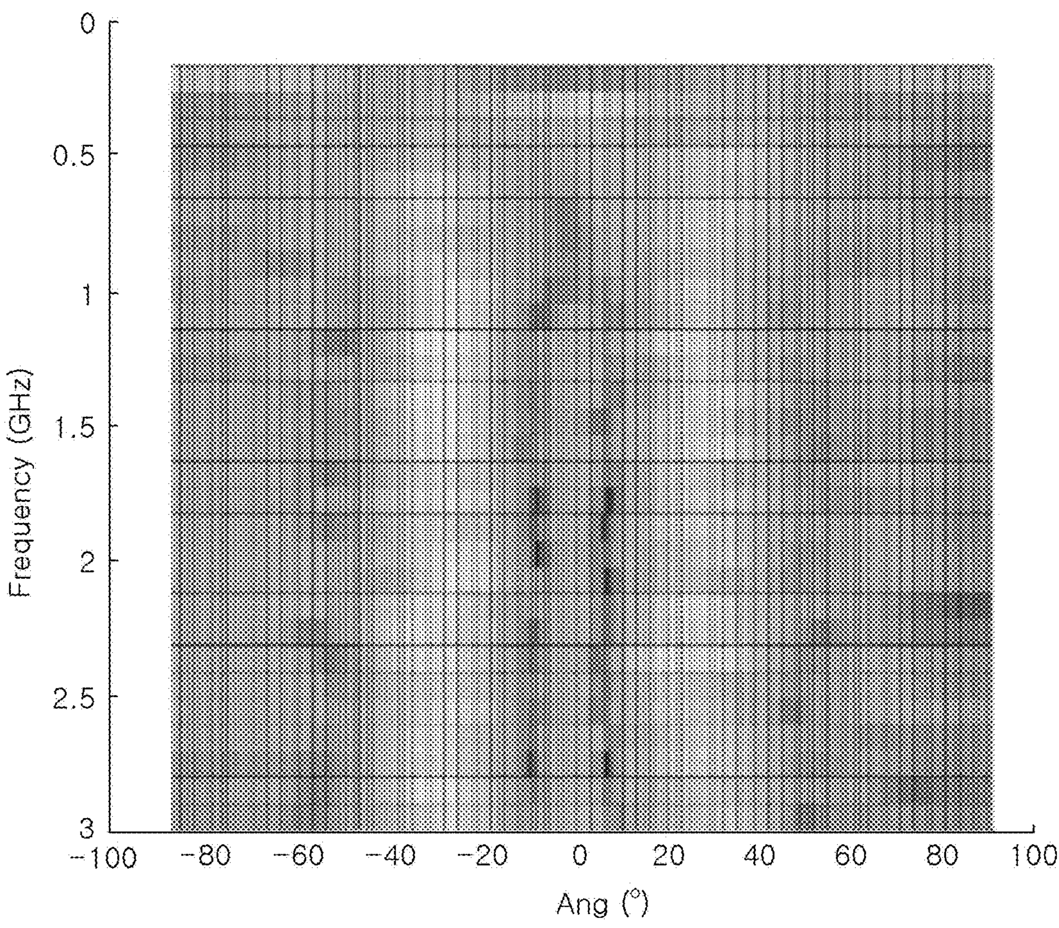

FIG. 10 illustrates results obtained by applying a weight vector, obtained by applying a loss function based on a uniform beam pattern to an LCMV beam synthesizer target beam pattern of 1.1 GHz frequency and at the same time applying a hybrid artificial neural network training method trained with a weight vector-based loss function to an LCMV beam synthesizer target weight vector with α=0.1, to the phase shift weight block 615 of FIG. 6, and shows the intensities of beams with respect to frequency and azimuth. It can be ascertained that FIG. 10 shows an intermediate pattern between the result of FIG. 8 and the result of FIG. 9.

FIG. 6 is a conceptual diagram for describing a frequency uniform multi-beam generation method according to an embodiment of the present disclosure.

Referring to FIG. 6, in the frequency uniform multi-beam generation method according to the embodiment, digital intermediate frequency data may be prepared through digital signal processing after being received by an antenna array including a plurality of antennas for each frequency and azimuth. The digital intermediate frequency data may be obtained by sequentially processing a signal received by the antenna array for each frequency and azimuth through the ADC 611, decimator 612, integer delay block 613, and fractional delay (FD) block 614.

Thereafter, the digital intermediate frequency data may be input to a pre-trained artificial neural network model, and the artificial neural network model may output a weight vector for generating wideband frequency uniform multiple beams. Here, instructions for performing the pre-trained artificial neural network model and the frequency uniform multi-beam generation method may be stored in the memory 110, and an operation of processing the instructions to output a weight vector corresponding to the digital intermediate frequency data may be performed by the processor 120.

Accordingly, the processor 120 may provide the weight vector to the phase shift weight block 615, and the phase shift weight block 615 may correct a beam synthesis weight vector that changes for each azimuth.

In this frequency uniform multi-beam generation method, the pre-trained artificial neural network model for frequency uniform multi-beam generation may be an artificial neural network model trained by the artificial neural network model training method described with reference to FIGS. 3 to 5. When an artificial neural network model is trained by the artificial neural network model training method described with reference to FIG. 5, it is possible to generate wideband frequency uniform multiple beams and, at the same time, secure required received bit error rate performance.

According to an embodiment, in order to generate a weight vector for wideband frequency uniform multi-beam generation, an artificial neural network may be trained based on supervised learning, or an artificial neural network based on unsupervised learning and reinforcement learning may be trained.

During a supervised learning process, received bit error rate performance may be significantly reduced in a specific angle combination and frequency band due to similarity between pieces of input intermediate frequency data. By using this similarity, clustering using unsupervised learning may be applied. T-SNE unsupervised learning, in which learning is performed by mapping high-dimensional data into two dimensions, can be used, which can be used as a basis for determining a beamforming azimuth interval of intermediate frequency data used as input data of an artificial neural network. To implement this, for example, an auto encoder network can be constructed by stacking multiple layers of fully connected layers, and a feature vector of input data represented in a latent space can be obtained through the output of the encoder. Then, similarity between pieces of input data can be determined by applying T-SNE unsupervised learning to such a feature vector. As a result of examining results of clustering data sets input to training based on T-SNE unsupervised learning based on a target azimuth interval, clusters of angle combinations did not overlap, and thus it can be ascertained that it is possible to correctly generate wideband frequency uniform multiple beams using an angle interval used in experiments.

Additionally, for reinforcement learning, a neural architecture search (NAS) technique for searching for and applying an optimal hyperparameter combination and structure for artificial neural network configuration and training may be applied to generation of a weight vector for wideband frequency uniform multi-beam generation. The hyperparameters are configured to be found by non-human code, and Optuna, a Python open source that automates hyperparameter tuning of a machine learning algorithm, can be used to find a combination for allowing acquisition of the most optimal performance within a set range. Here, an environment for reinforcement learning is the entire space where hyperparameters can be present, an agent is the artificial neural network model itself, and the object thereof may be to obtain a state representing the optimal combination by performing an action of selecting a hyperparameter combination in a direction in which a set total loss $L_{Total}$ is minimized.

Meanwhile, each step included in the artificial neural network model training method and/or frequency uniform multi-beam generation method according to the above-described embodiment may be implemented in a computer-readable recording medium in which a computer program programmed to perform the step is recorded.

In addition, each step included in the artificial neural network model training method and/or frequency uniform multi-beam generation method according to the above-described embodiment may be implemented in the form of a computer program programmed to perform the step and stored in a computer-readable recording medium.

Combinations of steps in each flowchart attached to the present disclosure may be executed by computer program instructions. Since the computer program instructions can be mounted on a processor of a general-purpose computer, a special purpose computer, or other programmable data processing equipment, the instructions executed by the processor of the computer or other programmable data processing equipment create a means for performing the functions described in each step of the flowchart. The computer program instructions can also be stored on a computer-usable or computer readable storage medium which can be directed to a computer or other programmable data processing equipment to implement a function in a specific manner. Accordingly, the instructions stored on the computer-usable or computer-readable recording medium can also produce an article of manufacture containing an instruction means which performs the functions described in each step of the flowchart. The computer program instructions can also be mounted on a computer or other programmable data processing equipment. Accordingly, a series of operational steps are performed on a computer or other programmable data processing equipment to create a computer-executable process, and it is also possible for instructions to perform a computer or other programmable data processing equipment to provide steps for performing the functions described in each step of the flowchart.

In addition, each step may represent a module, a segment, or a portion of codes which contains one or more executable instructions for executing the specified logical function(s). It should also be noted that in some alternative embodiments, the functions mentioned in the steps may occur out of order. For example, two steps illustrated in succession may in fact be performed substantially simultaneously, or the steps may sometimes be performed in a reverse order depending on the corresponding function.

The above description is merely exemplary description of the technical scope of the present disclosure, and it will be understood by those skilled in the art that various changes and modifications can be made without departing from original characteristics of the present disclosure. Therefore, the embodiments disclosed in the present disclosure are intended to explain, not to limit, the technical scope of the present disclosure, and the technical scope of the present disclosure is not limited by the embodiments. The protection scope of the present disclosure should be interpreted based on the following claims and it should be appreciated that all technical scopes included within a range equivalent thereto are included in the protection scope of the present disclosure.

What is claimed is:

1. An artificial neural network model training method performed by an electronic device, the method comprising:

preparing training data including digital intermediate frequency data based on a signal received from an antenna array of a multiple input multiple output (MIMO) system as input data, and a target beam pattern and a target weight vector as output data; and training an artificial neural network model for wideband frequency uniform multi-beam generation using the training data, wherein a weight vector of the artificial neural network model is recursively trained using both of a target beam pattern-based loss function and a target weight vector-based loss function to generate desired multiple beams.

2. The artificial neural network model training method of claim 1, wherein the weight vector of the artificial neural network model is obtained by using a total loss function defined as $L_{total}=L_{TWV}+\alpha \cdot L_{TBP}$, where $\alpha$ is a weight having a value between 0 and 1, $L_{TWV}$ is the target weight vector-based loss function, and $L_{TBP}$ is the target beam pattern-based loss function.

3. The artificial neural network model training method of claim 1, wherein the training includes converting the digital intermediate frequency data to a complex correlation matrix and inputting the converted complex correlation matrix into the artificial neural network model.

4. The artificial neural network model training method of claim 3, wherein the preparing includes determining a beamforming azimuth interval of the digital intermediate frequency data through unsupervised learning in which learning is performed by mapping high-dimensional data into two dimensions.

5. The artificial neural network model training method of claim 3, wherein the training includes tuning hyperparameters for obtaining the weight vector based on search results through neural network structure search.

6. A wideband frequency uniform multi-beam generation method performed by an electronic device, the method comprising:

preparing digital intermediate frequency data based on a signal received from an antenna array of a multiple input multiple output (MIMO) system; and inputting the digital intermediate frequency data to a pre-trained artificial neural network model to generate wideband frequency uniform multiple beams as an output of the artificial neural network model, wherein a weight vector of the artificial neural network model is recursively trained using both a target beam pattern-based loss function and a target weight vector-based loss function to generate desired multiple beams.

7. The frequency uniform multi-beam generation method of claim 6, wherein the weight vector of the artificial neural network model is obtained by using a total loss function defined as $L_{total}=L_{TWV}+\alpha \cdot L_{TBP}$, where $\alpha$ is a weight having a value between 0 and 1, $L_{TWV}$ is the target weight vector-based loss function, and $L_{TBP}$ is the target beam pattern-based loss function.

8. The frequency uniform multi-beam generation method of claim 6, wherein the inputting includes converting the digital intermediate frequency data to a complex correlation matrix and inputting the converted complex correlation matrix into the artificial neural network model.

9. The frequency uniform multi-beam generation method of claim 8, wherein the preparing includes determining a beamforming azimuth interval of the digital intermediate frequency data through unsupervised learning in which learning is performed by mapping high-dimensional data into two dimensions.

10. The frequency uniform multi-beam generation method of claim 8, wherein the artificial neural network model includes hyperparameters tuned based on a search result through neural network structure search.

11. A non-transitory computer readable storage medium storing instructions, when executed by one or more processors, configured to perform an artificial neural network model training method performed by an electronic device, the artificial neural network model training method comprising:

preparing training data including digital intermediate frequency data based on a signal received from an antenna array of a multiple input multiple output (MIMO) system as input data, and including a target beam pattern and a target weight vector as output data; and training an artificial neural network model for wideband frequency uniform multi-beam generation using the generated training data, wherein a weight vector of the artificial neural network model is recursively trained using both a target beam pattern-based loss function and a target weight vector-based loss function to generate desired multiple beams.

12. The non-transitory computer readable storage medium of claim 11, wherein the weight vector of the artificial neural network model is obtained by using a total loss function defined as $L_{total}=L_{TWV}+\alpha \cdot L_{TBP}$, where $\alpha$ is a weight having a value between 0 and 1, $L_{TWV}$ is the target weight vector-based loss function, and $L_{TBP}$ is the target beam pattern-based loss function.

13. The non-transitory computer readable storage medium of claim 11, wherein the training includes converting the digital intermediate frequency data to a complex correlation matrix and inputting the converted complex correlation matrix into the artificial neural network model.

14. The non-transitory computer readable storage medium of claim 11, wherein the preparing includes determining a beamforming azimuth interval of the digital intermediate frequency data through unsupervised learning in which learning is performed by mapping high-dimensional data into two dimensions.

15. The non-transitory computer readable storage medium of claim 11, wherein the training includes tuning hyperparameters for obtaining the weight vector based on search results through neural network structure search.

* * * * *